United States Patent
Mai et al.

(10) Patent No.: US 6,270,114 B2
(45) Date of Patent: *Aug. 7, 2001

(54) METHOD AND ARRANGEMENT FOR SEAT OCCUPANCY RECOGNITION IN A MOTOR VEHICLE

(75) Inventors: Rudolph Mai, Wolfsburg; Ruprecht Sinnhuber, Gifhorn; André Zander, Halberstadt, all of (DE)

(73) Assignee: Volkswagen AG, Wolfsburg (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/085,814

(22) Filed: May 27, 1998

(30) Foreign Application Priority Data

May 27, 1997  (DE) .................................. 197 22 085

(51) Int. Cl.[7] .......................................... B60R 21/32
(52) U.S. Cl. ................................. 280/735; 280/734
(58) Field of Search ..................... 280/734, 735; 297/180.12

(56) References Cited

U.S. PATENT DOCUMENTS

| | | |
|---|---|---|
| 5,322,323 | 6/1994 | Ohno et al. . |
| 5,330,226 | 7/1994 | Gentry et al. . |
| 5,515,933 | 5/1996 | Meyer et al. . |
| 5,602,425 | 2/1997 | Wilhelmi et al. . |
| 5,689,421 | 11/1997 | Görnig . |
| 5,770,997 * | 6/1998 | Kleinberg et al. .................... 280/735 |
| 5,783,871 * | 7/1998 | LeMense ............................... 280/735 |
| 6,012,006 * | 6/1998 | Ohneda et al. ....................... 280/735 |

FOREIGN PATENT DOCUMENTS

| | | |
|---|---|---|
| 443301 | 4/1927 | (DE) . |
| 4110702 | 10/1992 | (DE) . |
| 4338285 | 5/1995 | (DE) . |
| 4441184 | 6/1995 | (DE) . |
| 4424878 | 1/1996 | (DE) . |
| 4433601 | 4/1996 | (DE) . |
| 3802159 | 9/1996 | (DE) . |
| 4112579 | 10/1997 | (DE) . |
| 19724496 | 12/1997 | (DE) . |
| 2289332 | 11/1995 | (GB) . |
| 9217344 | 10/1992 | (WO) . |

* cited by examiner

Primary Examiner—Eric Culbreth
(74) Attorney, Agent, or Firm—Baker Botts L.L.P.

(57) ABSTRACT

A method and arrangement for seat occupancy recognition in a motor vehicle utilizes a seat occupancy sensor which is triggered only for an interval of time and only in predetermined situations.

10 Claims, 1 Drawing Sheet

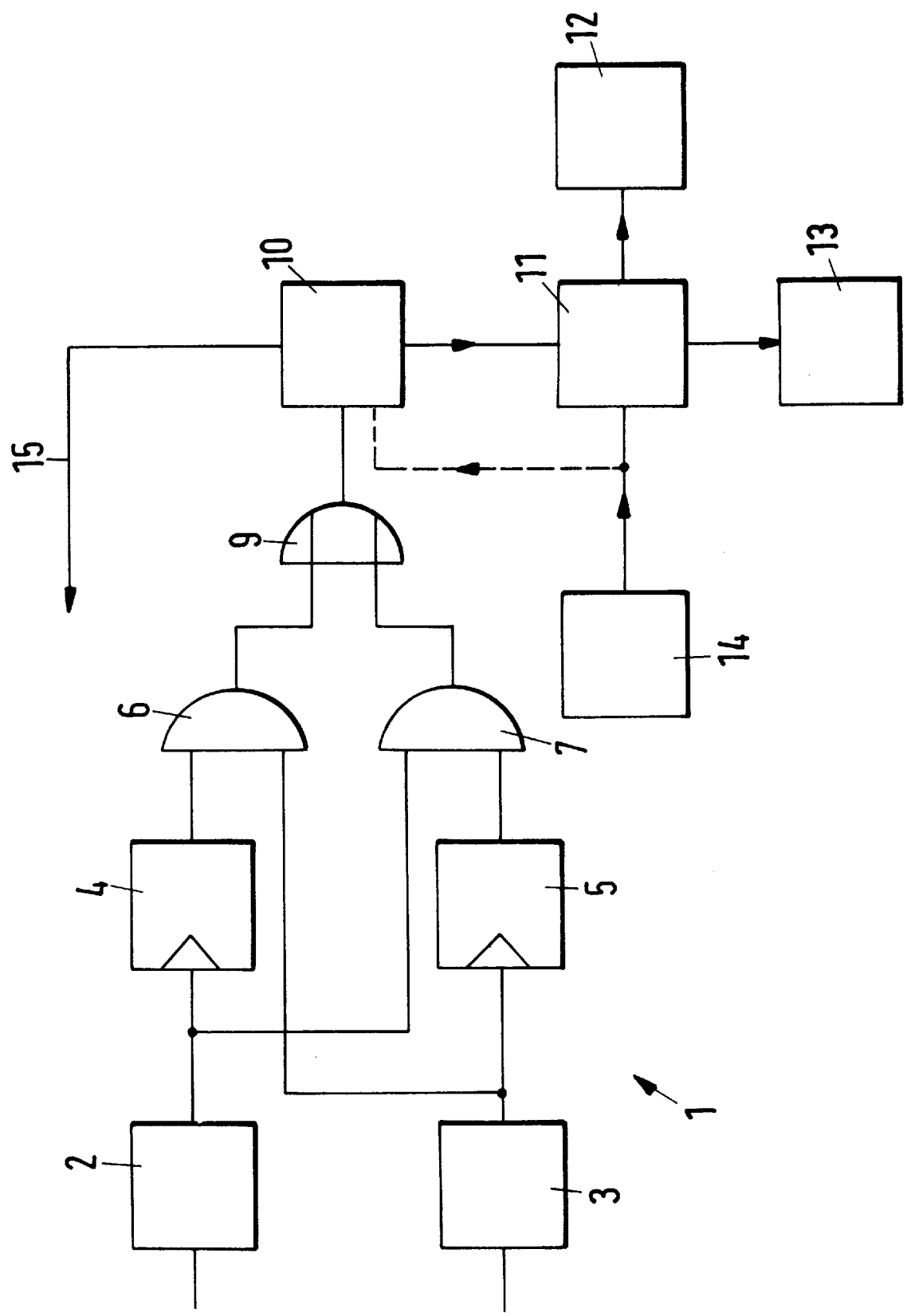

METHOD AND ARRANGEMENT FOR SEAT OCCUPANCY RECOGNITION IN A MOTOR VEHICLE

BACKGROUND OF THE INVENTION

This invention relates to methods and arrangements for seat occupancy recognition in motor vehicles.

For many reasons, knowing whether a vehicle seat is occupied and the nature of the occupancy is very important. If, for example, a child seat is in an incorrect position on a vehicle seat, triggering of an airbag may have serious consequences for a child in the child seat. Knowledge of the location of a person on a vehicle seat is of great interest since it is important to the function of an airbag that a minimum distance should be assured between the occupant and the airbag at the beginning of airbag release so that there will be enough time for the airbag to expand in a collision. Also, the airbag should be released only if the vehicle seat really is occupied, since repair of the released airbag is very expensive. Furthermore, comfort functions may be adjusted according to seat occupancy, like an air-conditioning unit or a fan which may be operated according to whether passenger seat is occupied or not.

German Patent No. 38 02 159 discloses a seat occupancy recognition arrangement for motor vehicles having adjustable seats in which occupancy of a vehicle seat is determined by a comparator which operates a switch, by displacement transducers detecting the position of the seat relative to the vehicle and the parts of seat relative to each other, and by a contact-free range finder measuring a distance from a seat surface or a part of a seat surface to a part of the vehicle on which a range finder is mounted. The comparator calculates a distance from the surface of the vehicle seat to the range finder sensor from position data of the displacement transmitters, compares the distance with that determined by the range finder and, if the readings coincide, triggers the switch. The range finder is preferably in the form of an ultrasonic or infrared sensor which transmits an ultrasonic or infrared signal toward the vehicle seat and receives a signal reflected from that direction by a surface of a person sitting on the seat or, if the seat is unoccupied, from the back rest of the seat, by which the seat occupancy condition may be inferred from the transit time of the signal.

U.S. Pat. No. 5,330,226 discloses a seat occupancy recognition arrangement in which an infrared sensor is mounted in the roof above the seat. The infrared sensor has a plurality of fields of vision by which the position of an occupant relative to the airbag is determined so that the airbag, when released, can be suitably triggered without injuring the occupant.

German Offenlungsschrift No. 41 10 702 discloses a seat occupancy recognition arrangement for actuating a seat heater in which a seat heating conductor mounted in the seat surface and heatable by electric current forms the first electrode of a capacitive seat occupancy sensor consisting of two electrodes.

A disadvantage of all prior art occupant detecting arrangements is that the vehicle occupants are continuously exposed to sources of radiation. Since the effects of long-term exposure to electromagnetic radiation, or to ultrasonic waves, are much in dispute, there is a danger that the well-being of the occupants may be impaired, or even that they may be injured, by a continuous exposure to radiation.

SUMMARY OF THE INVENTION

Accordingly, it is an object of the present invention to provide a method and arrangement for seat occupancy recognition in a motor vehicle which overcomes disadvantages of the prior art.

Another object of the invention is to provide a method and arrangement for seat occupancy recognition in a motor vehicle in which the occupants are subjected as little as possible to any kind of radiation.

These and other objects of the invention are attained by providing a method and arrangement for seat occupancy recognition in a motor vehicle in which a recognition device is actuated only in predefined situations and only for a certain interval of time. Consequently, the exposure of the occupants to radiation produced by the seat occupancy recognition device is reduced to an acceptable level.

Since a change in seat occupancy always requires a person getting in or a person getting out of a vehicle, most relevant situations involving a change of seat occupancy can be detected by a door condition sensor and/or an engine condition sensor. If the motor vehicle is started, the sensor must first check to determine which vehicle seats are occupied. For this purpose, various permutations are possible. Thus, the driver may get in and proceed to start the engine before all occupants are in the vehicle or the driver may wait to start the engine until after all occupants are seated. Since reliable seat occupancy recognition is possible only after the last action, preferably there should be an alternative scan by the detector in that condition.

In another preferred embodiment, a seat occupancy or occupant position recognition occurs only if a sensor for detecting an impending collision to trigger an airbag generates a signal, in which case the configuration of the sensor is such that it will detect a collision, or an impending collision, before any deceleration of the vehicle due to the collision affects the interior of the vehicle or its occupants.

According to one embodiment of the invention, the sensor for detecting an impending collision is a "pre-crash sensor." A pre-crash sensor consists of a plurality of individual sensors covering a neighborhood around the vehicle. If an object, or an obstacle, is detected in the neighborhood of the vehicle, the sensor detects the current distance of the object from the vehicle, and possibly the relative velocity between object and the vehicle, in order to signal an impending collision with the object.

According to another embodiment, an engine- and/or door-condition sensor detects whether a vehicle is occupied, and only the precise position of the vehicle seat and the sitting position of the occupant remain to be determined by a seat occupancy recognition arrangement which is actuated by the sensor for detecting a collision or impending collision.

BRIEF DESCRIPTION OF THE DRAWING

Further objects and advantages of the invention will be apparent from a reading of the following description in conjunction with the accompanying drawing which is a schematic block diagram illustrating a representative embodiment of an arrangement for seat occupancy recognition in a motor vehicle according to the invention.

DESCRIPTION OF PREFERRED EMBODIMENTS

In the typical embodiment of the invention shown in the drawing, a seat occupancy recognition arrangement I comprises a door-condition sensor 2 and an engine-condition sensor 3, and logic level recognition devices 4 and 5 associated with each of the sensors 2 and 3, respectively. The signal output from the sensor 2 or 3, together with the signal output of the logic level recognition device 5 for 4 or the other sensor 3 or 2, as the case may be, is supplied to the input of an AND gate 6 and 7, respectively. The signal outputs of the AND gates 6 and 7 are linked disjunctively by way of an OR gate 9 providing an output to a counter 10. The counter 10 is connected to a seat occupancy sensor 11 which, in turn, is operatively connected with an associated vehicle seat 12 and a seat heater 13. The recognition arrangement 1 further includes a pre-crash sensor 14 connectable either to the counter 10 or directly to the seat occupancy sensor 11.

Thus, in one example, a motor vehicle operator enters his vehicle and waits until his passengers are seated and the vehicle door is closed. When the doors are closed, there is a logic level 1 at the output of the door condition sensor 2. When the operator starts the engine, the logic condition at the output of the engine condition sensor 3 changes from logic 0 to logic 1. This positive logic level is detected by the logic level recognition device 5, which then changes its output from logic level 0 to logic level 1. Thus, both inputs of the AND gate 7 and at logic 1, and its output also switches to logic level 1, and consequently, the output of the OR gate 9 switches to logic level 1. The logic level 1 of the OR gate 9 enables the counter 10. The counter 10 then starts counting and runs up to a certain count which is either hard-wired or freely programmable. As long as the counter 10 runs, the seat occupancy sensor 11 is activated and detects whether the vehicle seat 12 is occupied. If the seat occupancy sensor 11 detects an occupant, the corresponding seat heater 13 is switched on. The seat occupancy sensor 11 may, for example, be an infrared, ultrasonic or capacitance sensor. When the counter 10 reaches its set count, it generates a reset signal 15 for the logic level recognition devices 4 and 5 to disable the sensors.

If a hazardous situation arises during vehicle operation that might call for release of the airbag, the pre-crash sensor 14 generates a signal that either enables the counter 10 or directly activates the seat occupancy sensor 11. The latter then determines the exact position of the occupant in order to control the airbag in such a way that its release will not injure the occupant. The seat heater 13 may be switched off either upon opening of the corresponding door or when the engine is shut off, or else by a negative result at the next seat occupancy recognition interval.

Although the invention has been described herein with reference to specific embodiments, many modifications and variations therein will readily occur to those skilled in the art. Accordingly, all such variations and modifications are included within the intended scope of the invention.

We claim:

1. A method for seat occupancy recognition in a motor vehicle utilizing at least one seat occupancy sensor and a plurality of individual pre-crash sensors for detecting objects in a neighborhood around the vehicle comprising the steps of:

actuating the seat occupancy sensor only to determine occupancy of vehicle seats in response to detection of a predetermined condition of a vehicle component upon start-up of vehicle operation and only for a limited time interval, and thereafter actuating the seat occupancy sensor during vehicle operation only to determine seat occupant positioning in response to a signal from one of the plurality of pre-crash sensors for detecting objects in the neighborhood around the vehicle to indicate an impending collision before the collision can affect the interior of the vehicle or an occupant of the seat.

2. A method according to claim 1 comprising actuating the seat occupancy sensor to determine occupancy of vehicle sets upon starting of a vehicle engine when all vehicle doors are closed.

3. A method according to claim 1 comprising actuating the seat occupancy sensor to determine occupancy of vehicle seats upon closing of a vehicle door when the engine is running.

4. A method according to claim 1 comprising recognizing seat occupancy in each of a plurality of predetermined situations utilizing a sensor profile which is specific to each of the predetermined situations.

5. A method according to claim 4 comprising initiating seat occupancy recognition upon at least one of starting of the vehicle engine and closing of the vehicle doors, and detecting at least one of a position of a vehicle seat and a sitting position of a vehicle seat occupant utilizing the seat occupancy sensor.

6. A method according to claim 5 wherein detection of a collision or an impending collision with an obstacle initiates detection of at least one of a position of a vehicle seat and a sitting position of a vehicle seat occupant.

7. A method for seat occupancy recognition in a motor vehicle utilizing at least one seat occupancy sensor comprising the step of:

actuating the seat occupancy sensor only in response to detection of a predetermined condition of a vehicle component and only for a limited time interval including controlling a seat heater with the seat occupancy sensor.

8. An arrangement for recognizing seat occupancy in a motor vehicle comprising a seat occupancy sensor, and a plurality of individual pre-crash sensors for detecting impending collisions with objects in a neighborhood around the vehicle and at least one of and an engine condition sensor, and a control system for controlling the operation of the seat occupancy sensor only to determine occupancy of vehicle seats in response to start-up of vehicle operation and thereafter during vehicle operation only to determine seat occupant positioning in response to a signal from a pre-crash sensor.

9. An arrangement according to claim 8 further comprising a counter responsive to at least one of: a collision or impending collision sensor; a door condition sensor; and an engine condition sensor, for activating the seat occupancy sensor for a limited time interval.

10. An arrangement for recognizing seat occupancy in a motor vehicle comprising a seat occupancy sensor and at least one of: a sensor to detect a collision or an impending collision with an obstacle; a door condition sensor; and an engine condition sensor, for controlling the operation of the seat occupancy sensor wherein the seat occupancy sensor is connected to a seat heater.

* * * * *